United States Patent [19]
Sabol

[11] 3,868,784
[45] Mar. 4, 1975

[54] FISHING LURE
[75] Inventor: Joseph J. Sabol, West Hazleton, Pa.
[73] Assignee: Garcia Corporation, Teaneck, N.J.
[22] Filed: Apr. 12, 1973
[21] Appl. No.: 350,648

[52] U.S. Cl............... 43/42.23, 43/42.3, 43/42.37, 43/42.39
[51] Int. Cl............................................. A01k 85/00
[58] Field of Search.............. 43/42.22, 42.3, 42.02, 43/42.39, 42.23, 42.37

[56] References Cited
UNITED STATES PATENTS

| | | | |
|---|---|---|---|
| 1,604,027 | 10/1926 | Dills | 43/42.3 |
| 1,663,080 | 3/1928 | Heddon | 43/42.3 X |
| 2,315,304 | 3/1943 | Upperman | 43/42.37 X |
| 2,715,790 | 8/1955 | Carpenter | 43/42.22 X |
| 2,748,520 | 6/1956 | Anderson | 43/42.39 X |
| 3,376,663 | 4/1968 | Amrine | 43/42.3 X |
| D220,839 | 6/1971 | Sabol | 43/42.3 UX |

Primary Examiner—Louis G. Mancene
Assistant Examiner—Daniel J. Leach
Attorney, Agent, or Firm—Fitzpatrick, Cella, Harper & Scinto

[57] ABSTRACT

A fishing lure including a body portion, a belly portion and legs, a hook extending from the lower rear portion of the belly downwardly before curving upwardly in a substantially arcuate manner and terminating at a barbed point in spaced relationship directly rearwardly of the body portion, a cork insert medially disposed within the body portion and the shank of the hook extending upwardly into the cork insert and having an extension passing forwardly through the body portion terminating in an eye disposed substantially centrally of the front surface of the body portion, and a pouch disposed in the lower medial portion of the belly for removably receiving sinker material.

10 Claims, 5 Drawing Figures

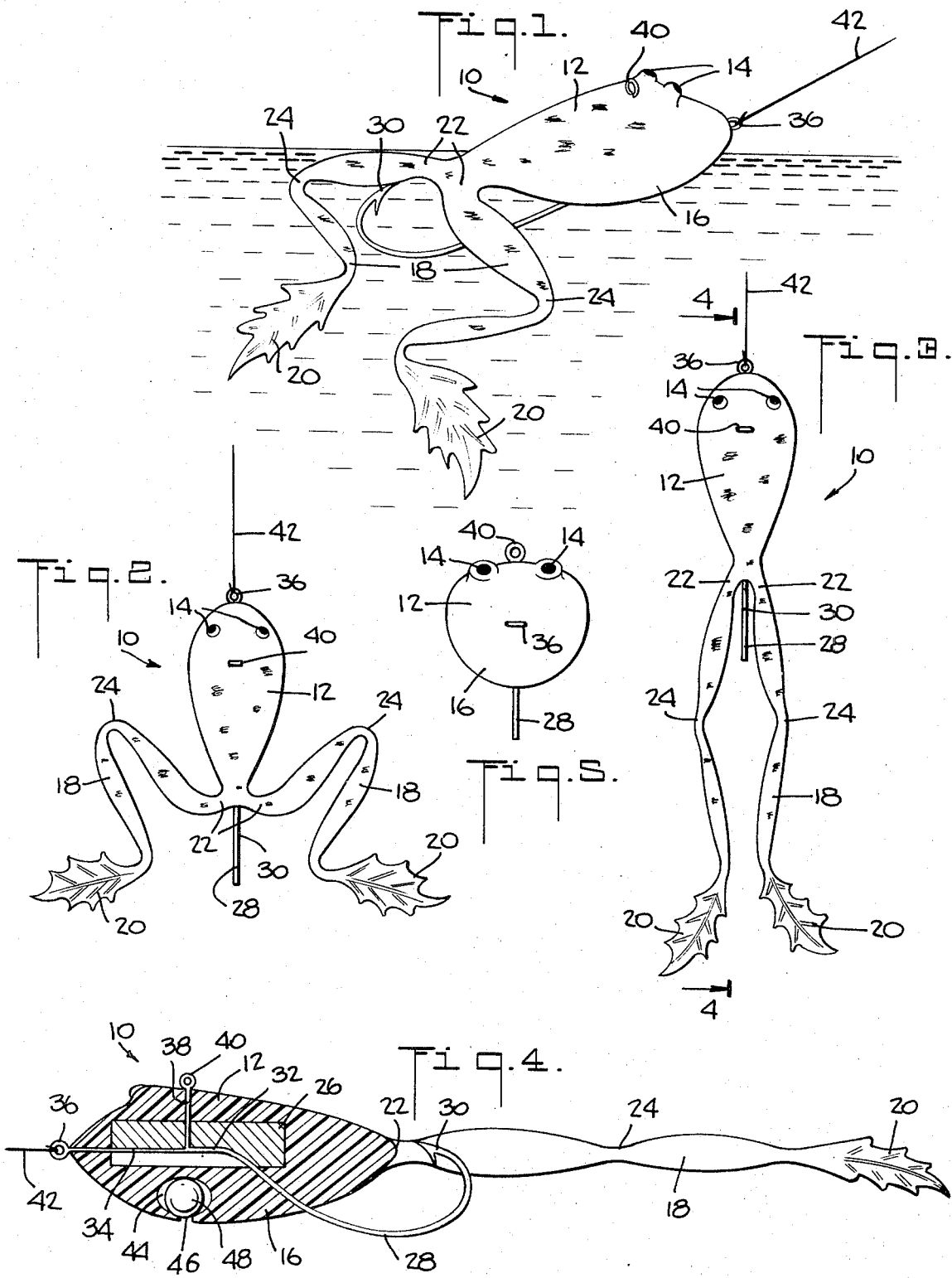

FISHING LURE

This invention relates to fishing accessories and, more particularly, to a new and improved fishing lure.

Heretofore, various forms of fishing lures have been used with varying degrees of success. However, they have not always been totally satisfactory due to poor hook design, lack of weedlessness, lack of balance, lack of versatility, and poor floatation characteristics. It is an object of this invention to provide a new and improved fishing lure which involves a novel combination of features combined in such a way as to afford a very efficient and effective solution to the difficulties encountered with the prior art, and which accomplishes the desired results, as will become apparent as the description proceeds.

Briefly, my invention contemplates the provision of a fishing lure characterized by, in one form thereof, a body portion having a belly portion, a hook extending from the lower rear portion of the belly, the hook extending downwardly before curving upwardly in a substantially arcuate manner and terminating in a barbed point in slightly spaced relationship directly rearwardly of the body portion. According to one aspect of my invention, a cork insert is medially disposed within the body portion and the shank end of the hook extends upwardly into the cork insert and has an extension passing forwardly through the body portion terminating in an eye disposed substantially centrally of the front surface of the body portion.

According to one form of the invention, a second extension of the shank portion passes upwardly through the body portion and terminates in a second eye disposed substantially medially of the upper surface of the body portion. Further, according to one aspect of the invention, the belly portion has a pouch in the lower medial portion thereof for removably receiving sinker means. Further, according to a form of the invention, the body portion has a pair of legs extending therefrom which are provided with spaced portions of reduced cross-sectional area to effect movement thereof, thereby to allow the legs to extend and retract in a swimming-like manner.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description, and is shown in the accompanying drawings, forming a part of the specification, wherein:

FIG. 1 is a side elevation of a fishing lure in the form of a frog facsimile, constructed in accordance with the concepts of my inventin;

FIG. 2 is a plan view of the fishing lure of FIG. 1, showing one position thereof;

FIG. 3 is a plan view of the fishing lure similar to FIG. 2, but showing a second position thereof;

FIG. 4 is a longitudinal sectional view taken along the line indicated at 4—4 in FIG. 3, and FIG. 5 is a front view of the fishing lure.

In the embodiment of the invention illustrated, FIG. 1 shows a lure, in the form of a facsimile of a frog, indicated generally at 10, in its swimming position. The frog comprises a body portion 12 having a pair of eyes 14, a belly portion 16 and a pair of legs 18 having fins 20. The legs are provided with portions 22 and 24 of reduced cross-sectional area to effect movement of the leg portions, thereby allowing the legs to extend and then retract in a swimming-like manner. Thus, as seen in FIGS. 1 and 2, the frog hangs in the water with its legs hanging downwardly in a natural position. A slight twitch on the rod tip (not shown) causes the frog to lurch forward. The bullet shape of the frog's body 12 allows it to move forward with ease, whereas the legs, which have a dragging effect, hold back just enough to stretch them out, as seen in FIGS. 3 and 4. By releasing a little line or twitching the rod tip, the frog assumes a true swimming motion.

As best seen in FIG. 4, a cork insert 26 is medially disposed in the frog's body 12, for floatation purposes. A hook 28 extends from the lower rear portion of the belly 16 and extends downwardly before curving upwardly in a gentle arcuate manner, terminating in a barbed point 30 slightly spaced directly rearwardly of the body portion, between the legs. The shank 32 of the hook extends up into the cork insert 26 and has a first extension 34 passing through the body in a forward direction, terminating in an eye 36 at the surface of the body portion at the center of the front thereof. A second extension 38 passes upwardly through the body portion terminating in a second eye 40 at the surface of the body, spaced slightly rearwardly and medially between the frog's eyes 14. The eyes 36 and 40 serve for the attachment of leaders 42 of a fishing line (one being shown). Eye 36 is generally employed for top water action, and either eye may be utilized for underwater or bottom action.

Still referring to FIG. 4, the belly portion 16 of the frog is provided with a pouch 44 having an inlet 46 or reduced cross-sectional area. Split shot sinkers 48 are removably positionable in the pouch for adding weight to the frog for balance and for underwater or bottom action.

As best seen in FIG. 5, the front of the body portion 12 is of generally ball shape which allows the frog to roll over in the water with ease, when it lands on its back. Because the hook adds weight to the bottom, the frog will automatically right itself when released in the water. Thus, even if the frog is laid on its back in the water, it will not remain there, but will automatically turn over to its upright position.

In operation, the frog is capable of sitting on the water, like its living counterpart. A short, sharp pull on the line results in an extremely realistic kicking action. Thus, the lure is capable of moving along the top of the water in a series of short swims. When a shot sinker is added to the pouch, the frog is capable of moving underwater above the bottom in a swimming-like motion.

It will thus be appreciated that the present invention does indeed provide an improved fishing lure, which is superior in hook design, weedlessness, versatility, floatation and balance as compared to prior art lures.

Although a certain particular embodiment of the invention is herein disclosed for purposes of explanation, various modifications thereof, after study of this specification, will be apparent to those skilled in the art to which the invention pertains.

What is claimed and desired to be secured by letters patent is:

1. A fishing lure comprising in combination, a body portion having a belly portion, aa hook extending from the lower rear portion of said belly portion, said hook extending downwardly before curving upwardly in a substantially arcuate manner and terminating in a barbed point in spaced relation directly rearwardly of the body portion, a cork insert medially disposed within said body portion, said hook having a shank portion extending upwardly into said cork insert and having an extension passing forwardly through said body portion terminating in an eye disposed substantially medially of the front surface of the body portion, a second extension of said shank portion passing upwardly through the body portion and terminating in a second eye disposed substantially medially of the upper surface of said body portion.

2. A fishing lure according to claim 1, wherein said belly portion has a pouch in the lower medial portion thereof for removably receiving sinker means.

3. A fishing lure according to claim 1, wherein said body portion has a pair of legs extending therefrom, said legs being provided with spaced portions of reduced cross-sectional area to effect movement of the leg portions, thereby to allow the legs to extend and retract in a swimming-like manner.

4. A fishing lure according to claim 1, wherein the form of said body portion is of substantially ball-shaped configuration.

5. A fishing lure comprising in combination, a flexible body portion having a belly portion, hook means extending from said belly portion, a cork insert medially disposed within said body portion, said belly portion having a pouch in the lower medial portion thereof for removably receiving sinker means, whereby the flexible belly portion accepts, retains and makes removable said sinker means.

6. A fishing lure in the form of a frog facsimile comprising, in combination, a body portion having a belly portion and a pair of legs extending therefrom, a hook extending from the lower rear portion of said belly portion, said hook extending downwardly before curving upwardly in a substantially arcuate manner and terminating in a barbed point in spaced relation directly rearwardly of the body portion between the legs, a cork insert medially disposed within said body portion, said hook having a shank portion extending upwardly into said cork insert and having an extension passing forwardly through said body portion terminating in an eye disposed substantially centrally of the front surface of the body portion, a second extension of said shank portion passing upwardly through the body portion and terminating in a second eye disposed substantially medially of the upper surface of said body portion, said belly portion having a pouch in the lower medial portion thereof for removably receiving sinker means, said legs being provided with spaced portions of reduced cross-sectional area to effect movement of the leg portions, thereby to allow the legs to extend and retract in a swimming-like manner, and said body portion being of substantially bullet-shaped configuration.

7. A fishing lure according to claim 5 wherein said pouch is of resilient material and has an inlet of reduced cross-sectional area, whereby said sinker means are insertable in the pouch by distending said inlet.

8. A fishing lure comprising, in combination, a body portion having a belly portion, a hook extending from the lower rear portion of said belly portion, said hook extending downwardly before curving upwardly in a substantially arcuate manner and terminating in a barbed point in spaced relation directly rearwardly of the body portion, said hook having a shank extension passing forwardly and thence upwardly through said body portion and terminating in an eye disposed substantially medially of the upper surface of said body portion.

9. A fishing lure according to claim 8 further comprising a second extension of said shank passing forwardly through said body portion and terminating in an eye disposed substantially medially of the front surface of the body portion.

10. A fishing lure according to claim 8, further comprising a cork insert medially within said body portion, said shank extension passing through said cork insert.

* * * * *